Patented Aug. 3, 1937

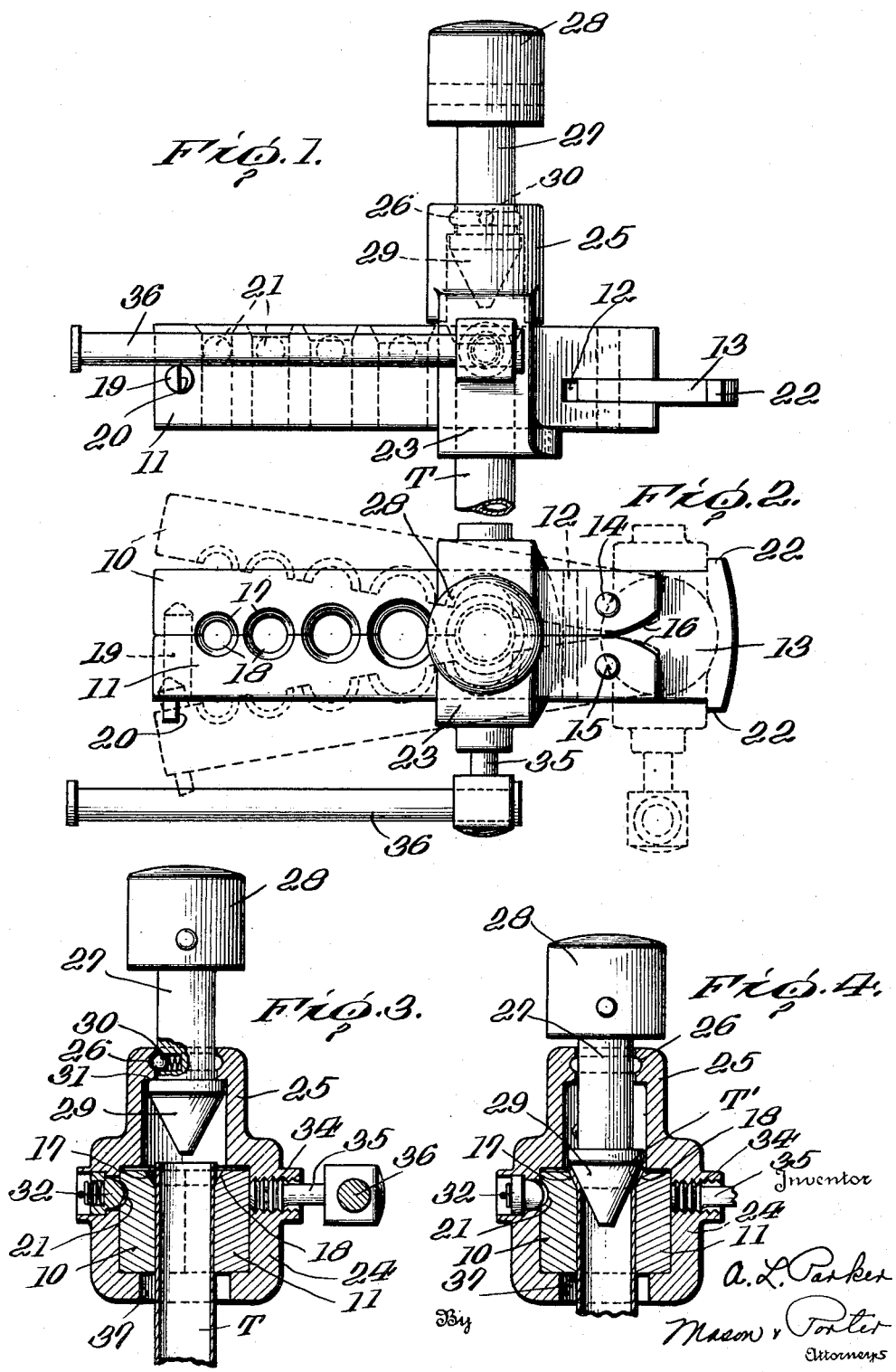

2,089,133

UNITED STATES PATENT OFFICE 2,089,133

TUBE FLARING TOOL

Arthur L. Parker, Cleveland, Ohio

Application November 4, 1935, Serial No. 48,222

9 Claims. (Cl. 153—79)

The present invention relates to new and useful improvements in tools for flaring the ends of metallic tubes and more particularly to a hand tool used for this purpose.

An object of the invention is to provide a hand tool for flaring the ends of tubes wherein clamping members for supporting the tube to be flared, a punch, and a support for the punch are all assembled as a unit.

A further object of the invention is to provide a tube flaring tool of the above type wherein the support serves as a guide for the punch, and also carries means for centering the punch over a tube for operation thereon.

A further object of the invention is to provide a flaring tool of the above type wherein the support is also provided with a clamping means for causing the clamping members to grip and support a tube.

A still further object of the invention is to provide a flaring tool of the above type wherein the clamping members are pivotally attached to a supporting shank onto which the support for the punch may be shifted so as to permit the clamping members to be swung to open position.

These and other objects will in part be obvious and will in part be hereinafter more fully described.

In the drawing:

Figure 1 is a side elevation of the tool.

Figure 2 is a top plan view of the same showing in full lines the clamping members as closed, and the support for the punch set for a flaring operation; and in dotted lines the support shifted off the clamping members onto the supporting shank so as to permit the clamping members to be opened.

Figure 3 is a sectional view transversely through the support and the clamping members with the punch raised and a tube positioned for flaring.

Figure 4 is a view similar to Fig. 3, showing the punch as forced into the tube and the end thereof expanded and flared.

The flaring tool embodying the invention includes two clamping members which are pivotally mounted on a supporting shank so that they may be swung relative to each other. These clamping members are provided on their adjacent faces with a series of opposed semi-cylindrical recesses, the opposed recesses being dimensioned so as to provide clamping jaws for the tube to be flared. The pairs of opposed recesses are of different diameters, corresponding to different diameters of tubes which are to be flared. The upper portion of the recesses is tapered outwardly to correspond to the desired flare that is to be formed on the tube end. Mounted on the clamping members is a support for the punch. This support is adapted to be shifted from one set position to another on the clamping members, and means is provided for determining each set position of the support so that the punch will be centered relative to the tube which is to be flared. Also mounted on the support is a clamping means which is used for forcing the clamping members into firm contact with the tube placed in the clamping jaws for flaring. The shank is so constructed that this supporting member for the punch may be shifted off the clamping members onto the shank so as to permit the clamping members to be swung relative to each other for releasing a tube after it is flared.

Referring more in detail to the drawing, the clamping members are indicated at 10 and 11. These clamping members are provided at one end thereof with slots 12 within which is located a shank member 13. The clamping member 10 is secured to the shank 13 by a pivot pin 14, and the clamping member 11 is secured to the shank by a pivot pin 15. The ends of the clamping members to the right of the pivots as viewed in Fig. 2 are cut away as indicated at 16 so as to allow these clamping members to swing away from each other as indicated in broken lines in Fig. 2.

The adjacent faces of the clamping members 10 and 11 are provided with a series of opposed semicircular recesses indicated at 17. These opposed recesses serve as clamping jaws for supporting the tube to be flared. The recesses as shown in Fig. 2 are of different radii so that tubes of different diameters may be clamped and flared. The upper portions 18 of the recesses 17 are tapered outwardly to correspond with the desired flare that is to be formed on the tube end, and the centers of the curved surfaces of the tapered portions and the recesses 17 coincide when the clamping members are closed so that these upper portions become die members for the shaping of the flared end of the tube.

A pin 19 carried by the clamping member 11 is adapted to extend into a recess in the clamping member 10 for aligning the two members when they are moved to a position for clamping the tube. It is essential that the upper faces of the clamping members, when supporting a tube, shall lie in a plane at right angles to the axis of the tube, so that the tapered portions of the recesses will produce a uniform flare all the way around the tube. This is accomplished by the pin 19 entering the recess and thus aligning the two members when brought into clamping engagement with the tube.

The outer face of the clamping member 10 is provided with a series of relatively small circular depressions 21. There is a depression associated with each pair of opposed recesses, and the purpose of these depressions will be hereinafter described.

Mounted on the clamping members is a support 23 which is adapted to be shifted along the clamping members from one set position to another. The shank 13 extends beyond the ends of the clamping members and is provided with stop shoulders 22. The support can be shifted along the clamping members onto the shank, and when in contact with the stop shoulders 22, the support will be wholly to the right of the pivots 14 and 15 as viewed in Fig. 2, and this enables the clamping members to be swung to the dotted line position.

The support 23 is provided with a body portion 24 which extends across the top of the clamping members when in closed position, along the sides thereof, and underneath the clamping members. The underneath portion of the support 23 is cut away to provide a recess 37 which permits the support to be properly centered without abutting against the tube.

The support 23 is provided with a sleeve 25 which serves as a guide for a punch 27. The punch 27 has a tapered or flaring end 29 which is so dimensioned that the taper thereof is substantially parallel with the taper 18 at the upper portion of each recess. This tapered portion on the punch is of sufficient length so that the one punch may be used in connection with the various sized tubes which are adapted to be flared on the flaring tool. The punch is provided with a head 28, and after the support is clamped in a position directly over the tube, then the punch may be forced into the tube as indicated in Fig. 4: this will expand the metal of the end of the tube until it is brought into contact with the tapered portion 18 which together with the punch die-shapes the upper end of the tube, producing the desired flare thereon. The angle of flare produced on the tube is determined by the taper of the recess 18 and the taper of the flaring head 29 on the punch, and therefore regardless of the size of the tube, flared ends will be produced which are of uniform angle. The punch is held in a raised position by means of a ball 30 mounted in a radial recess formed in the shank portion of the punch 27, in the rear of which is a spring, so that the ball is yieldingly forced outward to a limited extent. The edge of the radial recess is crimped inwardly so as to prevent the ball from being forced out of the recess by the spring. The ball projects sufficiently to function as a yielding means for holding the punch in raised position. The sleeve 25 which guides the punch has an annular groove 26 formed therein, and when the punch is in raised position the ball is brought into alignment with this groove 26 and the ball, springing into the groove, will hold the punch yieldingly in its raised position. The upper end of the punch head is provided with a shoulder 31 which in raised position contacts with the shoulder on the guiding sleeve 25.

The support 23 is moved to the dotted line position shown in Fig. 2. This permits the clamping members to be swung to their open position to facilitate the placing of a tube T to be flared in alignment with the pair of jaws which will clamp and support the same. The clamping members are then moved to the full line position shown in Fig. 2. The opposed recesses are so dimensioned that the movement of the clamping members toward each other is limited by contact of the clamping members with the tube. After the tube has been placed as indicated in Fig. 3, with the end thereof projecting preferably to a distance slightly above the plane of the upper faces of the clamping members, then the support 23 is moved off the shank and onto the clamping members. The support is provided with a positioning pin 32 which is spring pressed toward the clamping member. This pin has its inner end rounded and shaped to conform to the depressions formed in the outer face of the clamping member 10. As the support is shifted along the clamping members, the pin will ride on the face of the clamping member 10 and will enter the depression when it is moved to a position in register therewith. When the support is thus placed in a set position relative to a pair of recesses, the punch is centrally over the recesses and is thus centered relative to the tube which is to be flared. This insures a uniform shaping of the flared end of the tube.

The support for the punch also carries a means for forcing the clamping members into tight gripping contact with the tube. This is shown as in the form of a clamping screw 35 which has a threaded connection 34 with the body portion 24 of the support 23. The clamping screw is provided with a handle 36 which slides freely in the head of the screw, and this handle may be used for turning the screw. The inner end of the screw contacts with the outer face of the clamping member 11 and will force the clamping member 11 against the tube, the tube against the clamping member 10, and the clamping member 10 against the opposite inner face of the support for the punch. After the support is positioned so as to center the punch over the tube that is to be flared, then the clamping screw is turned so as to firmly grip the tube and prevent any endwise movement thereof in the clamping members during flaring. The punch is then forced into the tube by means of a hammer or other suitable tool and the end is expanded until it contacts with the tapered wall 18, as indicated at T'. The punch is then raised and will be held in raised position by the ball 30 springing into the groove 26. The clamping screw is released and then the support 23 is shifted to the dotted line position shown in Fig. 2. The pin 32 is preferably so disposed in the support 23 that it bears against the inner end of the clamping member 10, and when in this dotted line position the pin will tend to open the clamping members so as to release the tube. This aids in the quick releasing of the tube after the flaring operation is completed. The pin 19 is extended beyond the outer face of the clamping member 11, and the end thereof is cut away so as to provide a stop shoulder 20 for limiting the shiftable movement of the support and preventing its being accidentally moved off the outer ends of the clamping members.

It is obvious that minor changes in the details of construction and arrangement of parts may be made without departing from the spirit of the invention as set forth in the appended claims.

I claim:

1. A tube flaring tool comprising clamping members having opposed recesses forming clamping jaws for supporting a tube to be flared, said recesses being tapered at the upper portion thereof to conform to the flare to be formed on the tube, a support shiftably mounted on said clamping members, a punch mounted in said support and adapted to expand the end of a tube into contact with the tapered portion of the recess, and means independent of the punch and carried by said support for centering the punch over the tube.

2. A tube flaring tool comprising clamping members having opposed recesses forming clamping jaws for supporting a tube to be flared, said recesses being tapered at the upper portion thereof to conform to the flare to be formed on the tube, a support shiftably mounted on said clamping members, a punch mounted in said support and adapted to expand the end of a tube into contact with the tapered portion of the recess, and means independent of the punch and carried by said support and cooperating with one of said clamping members for centering the punch over the tube.

3. A tube flaring tool comprising clamping members having opposed recesses forming clamping jaws for supporting a tube to be flared, said recesses being tapered at the upper portion thereof to conform to the flare to be formed on the tube, a support shiftably mounted on said clamping members, a punch mounted in said support and adapted to expand the end of a tube into contact with the tapered portion of the recess, means independent of the punch and carried by said support for centering the punch over the tube and means carried by said support for holding said clamping members together.

4. A tube flaring tool comprising clamping members having opposed recesses forming jaws for supporting a tube to be flared, said recesses being tapered at the upper portion thereof to conform to the flare to be formed on the tube, a shank member on which said clamping members are pivotally mounted, said shank being of substantially the same width as the clamping members when closed and extending beyond the ends thereof, a support shiftably mounted on said clamping members, said support being shiftable onto said shank member to permit said clamping members to be swung apart for the insertion or removal of a tube, and a punch mounted in said support and adapted to expand the end of the tube into contact with the tapered portion of the recess.

5. A tube flaring tool comprising clamping members having opposed recesses forming jaws for supporting a tube to be flared, said recesses being tapered at the upper portion thereof to conform to the flare to be formed on the tube, a shank member on which said clamping members are pivotally mounted, said shank being of substantially the same width as the clamping members when closed and extending beyond the ends thereof, a support shiftably mounted on said clamping members, said support being shiftable onto said shank member to permit said clamping members to be swung apart for the insertion or removal of a tube, a punch mounted in said support and adapted to expand the end of the tube into contact with the tapered portion of the recess, and means carried by said support for centering the punch over the tube.

6. A tube flaring tool comprising clamping members having opposed recesses forming jaws for supporting a tube to be flared, said recesses being tapered at the upper portion thereof to conform to the flare to be formed on the tube, a shank member on which said clamping members are pivotally mounted, a support shiftably mounted on said clamping members, said support being shiftable onto said shank member to permit said clamping members to be swung apart for the insertion or removal of a tube, a punch mounted in said support and adapted to expand the end of the tube into contact with the tapered portion of the recess, and yielding means carried by said support and cooperating with one of said clamping members for centering the punch over the tube, said yielding means constantly bearing on the side of said clamping member and serving to separate the clamping members when said support is shifted onto said shank member.

7. A tube flaring tool comprising clamping members having opposed recesses forming jaws for supporting the tube to be flared, said recesses being tapered at the upper portion thereof to conform to the flare to be formed on the tube, one of said clamping members having spaced depressions opposite each recess therein, a support shiftably mounted on said clamping members, a punch mounted in said support and adapted to expand the end of the tube into contact with the tapered portion of the recess, and a spring pressed member carried by said support and cooperating with said depressions for centering the punch over the tube.

8. A tube flaring tool comprising clamping members having opposed recesses forming jaws for supporting a tube to be flared, said recesses being tapered at the upper portions thereof to conform to the flare to be formed on the tube, means for aligning said clamping members when closed whereby the centers of the curved faces of the tapered portions of said recesses will coincide, a support shiftably mounted on said clamping members, a punch mounted in said support and adapted to expand the end of the tube into contact with the tapered portion of the recess, and means carried by said support for clamping said clamping members together.

9. A tube flaring tool comprising clamping members having opposed recesses forming jaws for supporting a tube to be flared, said recesses being tapered at the upper portions thereof to conform to the flare to be formed on the tube, means for aligning said clamping members when closed whereby the centers of the curved faces of the tapered portions of said recesses will coincide, a support shiftably mounted on said clamping members, a punch mounted in said support and adapted to expand the end of the tube into contact with the tapered portion of the recess, means carried by said support for centering the punch over the tube, and means carried by said support for forcibly clamping said clamping members together.

ARTHUR L. PARKER.